US009654557B2

United States Patent
Pandey (10) Patent No.: US 9,654,557 B2
(45) Date of Patent: May 16, 2017

(54) CLEAR IN-MEMORY BUSINESS DATA CACHE ACROSS SERVERS WITHOUT RESTARTING SERVERS

(71) Applicant: ORACLE INTERNATIONAL CORPORATION, Redwood Shores, CA (US)

(72) Inventor: Pradip K. Pandey, Highlands Ranch, CO (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 758 days.

(21) Appl. No.: 13/888,413

(22) Filed: May 7, 2013

(65) Prior Publication Data

US 2014/0089453 A1 Mar. 27, 2014

Related U.S. Application Data

(60) Provisional application No. 61/706,425, filed on Sep. 27, 2012.

(51) Int. Cl.
*G06F 15/167* (2006.01)
*H04L 29/08* (2006.01)
*G06F 9/54* (2006.01)

(52) U.S. Cl.
CPC .......... *H04L 67/1097* (2013.01); *G06F 9/542* (2013.01); *G06F 2209/544* (2013.01)

(58) Field of Classification Search
None
See application file for complete search history.

(56) References Cited

U.S. PATENT DOCUMENTS

| 5,388,224 A * | 2/1995 | Maskas | G06F 13/4217 710/104 |
| 6,839,750 B1 * | 1/2005 | Bauer | H04L 41/0233 709/223 |
| 2012/0323872 A1 * | 12/2012 | Vasquez Lopez | 707/704 |

* cited by examiner

*Primary Examiner* — Jeffrey R Swearingen
(74) *Attorney, Agent, or Firm* — Kilpatrick Townsend & Stockton LLP (57) ABSTRACT

Embodiments of the invention provide systems and methods for updating cache data on multiple servers without requiring a restart of those servers. More specifically, embodiments of the present invention provide an ability for an application to clear one or more cached tables when the table content has been modified. The cache can be refreshed across servers without impacting the active transactions of end users. So for example, during a business process such as the general ledger period close the system will no longer need a system restart to update cached period information.

13 Claims, 8 Drawing Sheets

CLEAR IN-MEMORY BUSINESS DATA CACHE ACROSS SERVERS WITHOUT RESTARTING SERVERS

CROSS-REFERENCES TO RELATED APPLICATIONS

The present application claims benefit under 35 USC 119(e) of U.S. Provisional Application No. 61/706,425, filed on Sep. 27, 2012 by Pandey and entitled "Clear In-Memory Business Data Cache Across Server Without Restarting Servers," of which the entire disclosure is incorporated herein by reference for all purposes.

BACKGROUND OF THE INVENTION

Embodiments of the present invention relate generally to methods and systems for managing a common cache on multiple servers and more particularly to updating cache data on multiple servers without requiring a restart of those servers.

Enterprise applications support a wide variety of business functions including but not limited to accounting and financial services, human capital management services, customer relationship management services, supply chain management services, etc. When implemented by a business, these applications and even multiple instances of the same application can be executed on a number of different application servers throughout the businesses location(s). Each of the executing applications and/or instances may use a set of tables or other business information that is common or shared between the applications and/or instances. For example, a set of financial information may be used by multiple instances of an accounting application.

To improve performance of these applications, middleware applications can cache some business data tables from database on the application servers for use by the applications. But the result of this is that the cache at each location is a copy of the data and is replicated in multiple locations, i.e., on different servers and on different processes on each of those servers. In previous systems, if that data is modified by any of those processes, the middleware and all of the servers needs to be restarted to put the change into effect. So, if one process updates the cache copy the other processes on the other servers will not see the change and transactions on or using that data handled by those other processes will be incorrect. Previously, to propagate the changes to all processes on all servers, a restart would be performed at a controlled time. When the processes restart, the cache is reloaded and refreshed by that process. However, with large volumes of data and/or many servers or processes, this approach can be very time consuming and inconvenient. Hence, there is a need for improved methods and systems for updating cache data on multiple servers without requiring a restart of those servers.

BRIEF SUMMARY OF THE INVENTION

Embodiments of the invention provide systems and methods for updating cache data on multiple servers without requiring a restart of those servers. According to one embodiment, resetting a common cache across a plurality of servers can comprise sending a request to reset at least a portion of the common cache from a first server to a server manager. In some cases, sending the request to reset at least a portion of the common cache from the first server to the server manager can comprise making an Application Program Interface (API) call to the server manager from an application executing on the first server. In other cases, sending the request to reset at least a portion of the common cache from the first server to the server manager can comprise issuing the request from an administration tool executing on the first server. The request to reset at least a portion of the common cache can, in some instances, comprise a request to reset all of the common cache.

The server manager can receive the request from the first server and broadcast a cache reset notification to the plurality of servers in response to receiving the request from the first server. Broadcasting, by the server manager, the cache reset notification to the plurality of servers in response to receiving the request from the first server can include converting the request to a cache reset notification. The cache reset notification can identify a table and environment of the portion of the cache to be reset.

At least a second server of the plurality of servers can receive the cache reset notification from the server manager and can reset a portion of the common cache based on the cache reset notification and without restarting the second server. Resetting the portion of the common cache based on the cache reset notification and without restarting the second server can comprise locating the environment in the common cache on the second server, locating the table in the common cache on the second server, identifying a cache handle for the portion of the common cache based on the located environment and table, and resetting records of the common cache identified by the cache handle and within the identified environment and table. In some cases, resetting records of the common cache identified by the cache handle and within the identified environment and table can further comprise prior to resetting records of the common cache identified by the cache handle and within the identified environment and table, issuing, by the second server, a thread halt command, the thread halt command causing each thread of the second server to commit current work and halt operation. In such cases, after resetting records of the common cache identified by the cache handle and within the identified environment and table, the second server can issue a thread halt release command, the thread halt release command causing each halted thread of the second server to resume operation.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for updating cache data on multiple servers without requiring a restart of those servers. More specifically, embodiments of the present invention provide an ability for an application to clear one or more cached tables when the table content has been modified. The cache can be refreshed across servers without impacting the active transactions of end users. So for example, during a business process such as the general ledger period close the system will no longer need a system restart to update cached period information. Various additional details of embodiments of the present invention will be described below with reference to the figures.

Figure 1:
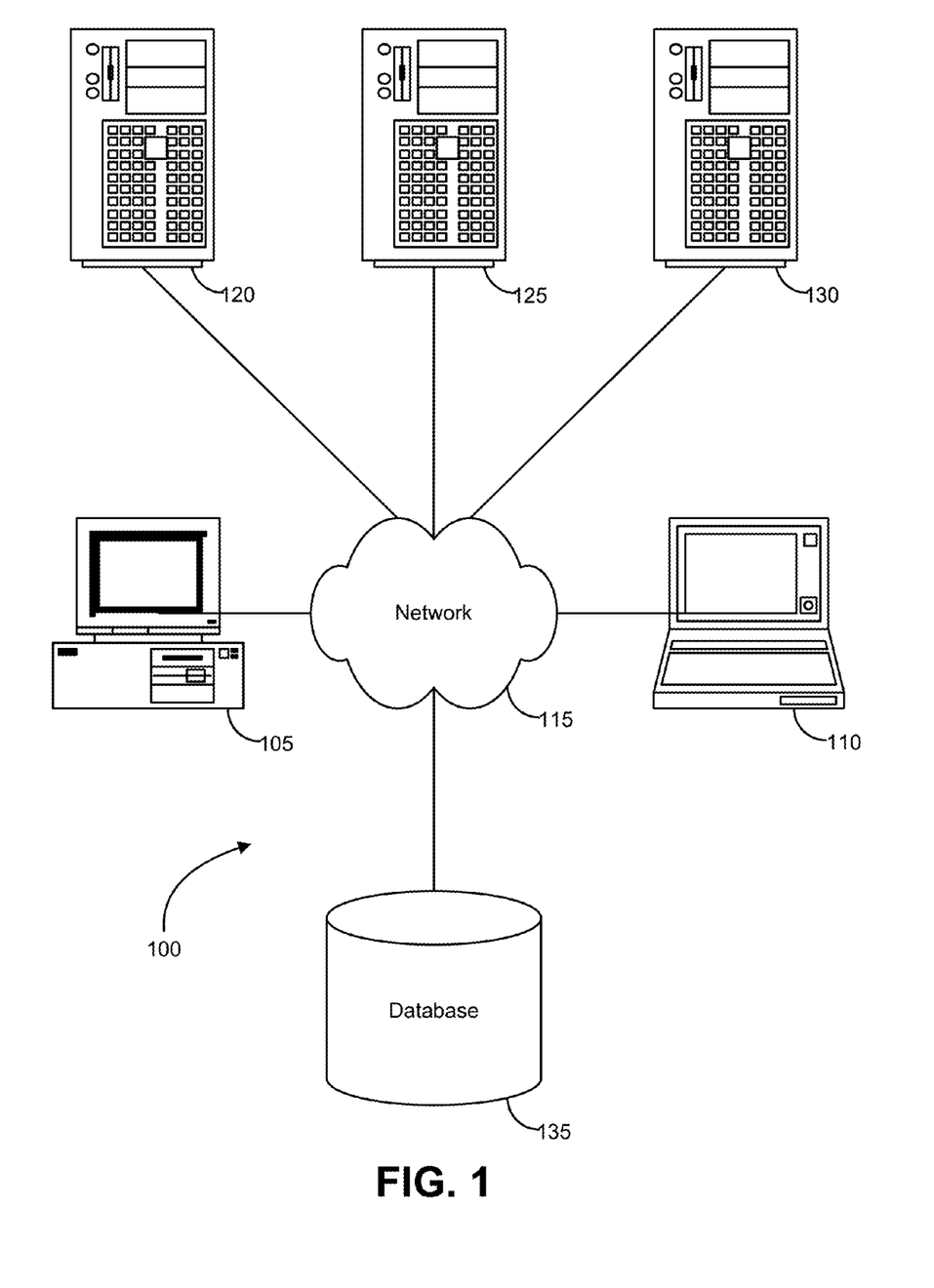
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
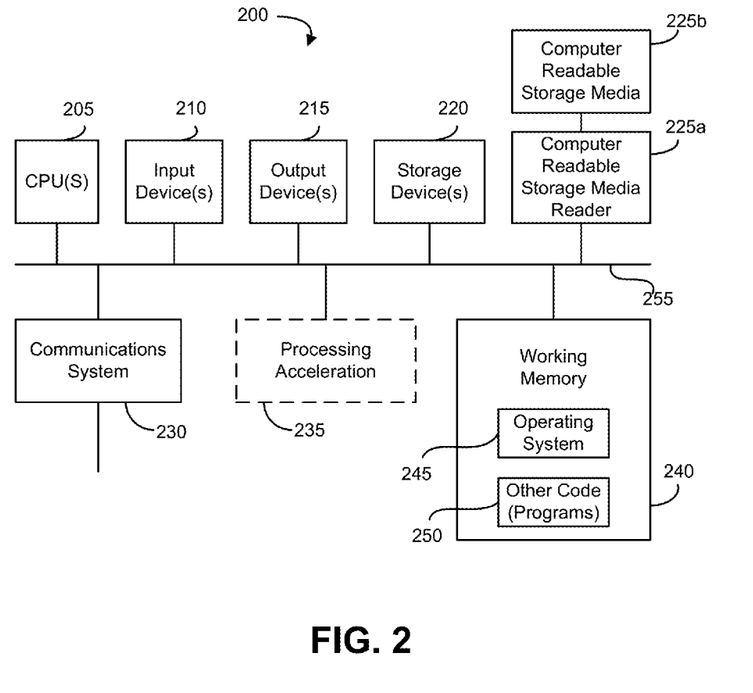
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
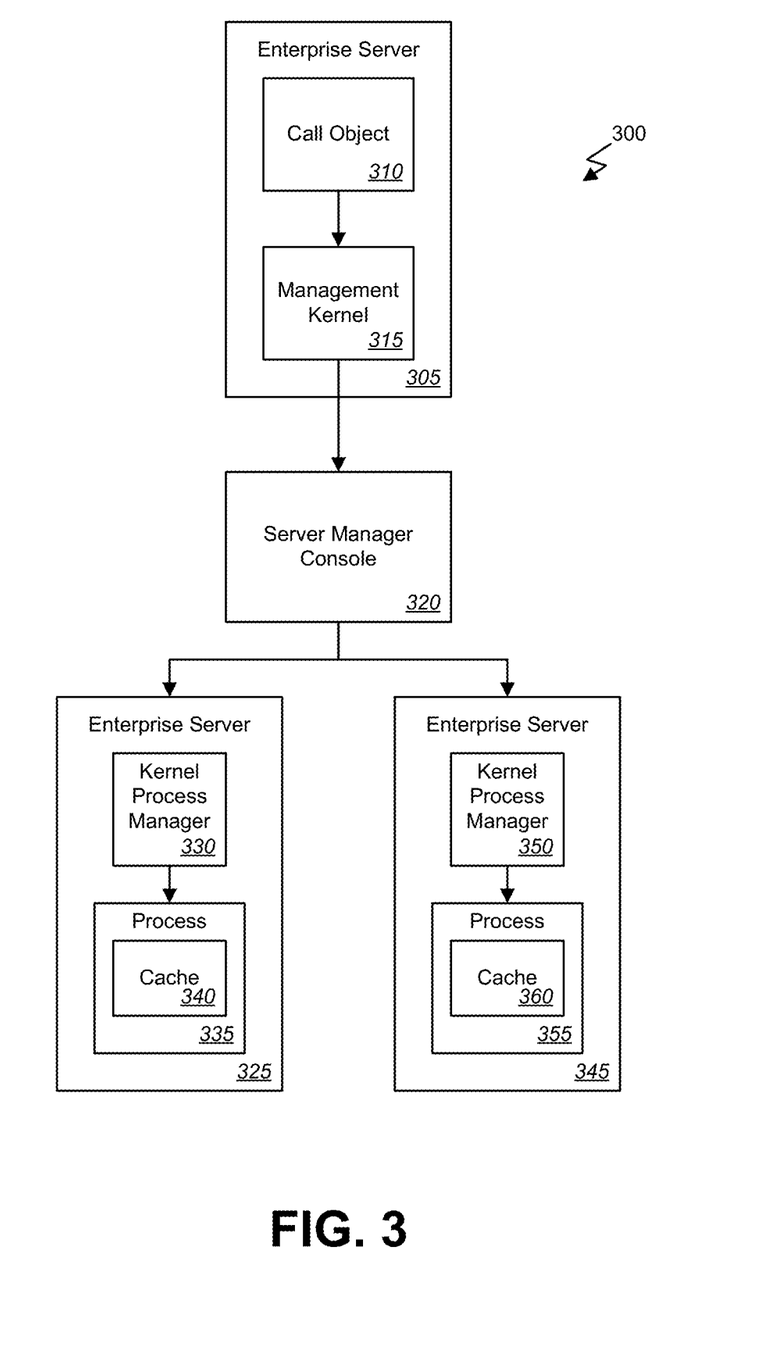
FIG. 3 is a block diagram illustrating, at a high-level, functional components of a system for resetting a common cache across servers without restarting the servers according to one embodiment of the present invention.

FIG. 3 is a block diagram illustrating, at a high-level, functional components of a system for resetting a common cache across servers without restarting the servers according to one embodiment of the present invention. As illustrated in this example, the system 300 can include a number of enterprise servers 305, 325, and 345. Some or all of these servers 325 and 345 can execute a process 335 and 355 such as an instance of an enterprise application. These processes 335 and 355 may maintain a copy of a common cache 340 and 360. For example, a system 300 using JDE EnterpriseOne executing a processes 335 and 355 on servers 325 and 345 can improve performance by caching 340 and 360 specific tables in the Call Object Kernel using the JDB Cache feature. With tables cached in JDB, any update or delete of a record in a cached table requires a clear of the cache on that kernel for the data to be available to all users. Previously, the system 300 restarted the servers 325 and 345 to update cached information 340 and 360. This causes a down time for the end users, impacts the productivity as well as data integrity, and creates mismatch issues across servers till the servers were restarted.

Embodiments of the present invention can prevent the downtime involved with multiple enterprise server restarts to take into effect the updated table column values for the cached tables. This can also improve the end user productivity mainly during month end, quarter end, and year end closing times when large volumes of data are being processed. Embodiments of the present invention can enhance the usability of common caches 340 and 360 across servers 325 and 345 where customers can leverage it for other tables as the cached table updates can be available without server restart. Embodiments allow end users running business applications to see the updates for cached business table data without server restart and associated down time. Embodiments of the present invention can provide different interfaces to clear table caches 340 and 360 across servers 325 and 345 including but not limited to: an application developer can code a call to a system level API to automatically clear caches after a table has been updated; a user can access a web based administration application to clear a table cache for a specific environment/table; and/or an administrator can access a function of the server manager to clear a table cache for a specific environment/table.

More specifically, the system can also include a server manager console 320. The server manager 320 can be considered a gatekeeper and each server 325 and 345 can subscribe to. On a trigger to the server manager 320, it can broadcast a notification to each server 325 and 345 that a table of the cache 340 and 360 has been updated. Each server 325 and 345 can then reset the cache 340 and 360 and fetch the data from the database. Embodiments described herein can be used with any data that is relatively constant but is updated periodically. Such data can include, for example, fiscal period close data.

The server manager 320 can receive a request to reset a cache from a management kernel 315 of an enterprise server 305. This request can be initiated at the first server 305 by API call from application 310 or through a user interface provided by administration or management tool. In the case of an administration tool, the reset can be performed by table, by environment, or globally, i.e., all tables in all environments. Regardless of how the request originates, in response to the request the server manager 320 can send a notification to each of the enterprise servers 325 and 345, i.e., the server manager 320 can broadcasts a clear cache notification to all servers 325 and 345.

Each server 325 and 345 can include an implementation of a reset cache method, e.g., in a kernel process manager 330 and 350, which can be invoked through an API by the clear cache notification from the server manager 320. This method can check for an environment and a table identified in the notification. If the environment and table are found in the local cache 340 and 360 for the server 325 and 345, the method can reset the records of the table and environment. It should be understood that multiple threads of one or more processes 335 and 355 may be running one each server 325 and 345, each using the cache 340 and 360. Therefore, according to one embodiment, the cache reset method can issue a thread halt command before resetting the cache 335 and 360. This command can cause each thread to commit current work and halt. Then, after the cache 335 and 360 has been refreshed, the cache reset method can issue a release command to allow each thread to resume.

Stated another way, resetting a portion of a common cache 340 and 360 can begin with generating a request to reset the cache by a first enterprise server 305. The request to reset at least a portion of the common cache 340 and 360 can be sent from the first server 305 to the server manager 320. As noted above, sending the request to reset at least a portion of the common cache 340 and 360 from the first server 305 to the server manager 320 can comprise making an Application Program Interface (API) call to the server manager 320 from an application 310 executing on the first server 305. In other cases, sending the request to reset at least a portion of the common cache 340 and 360 from the first server 305 to the server manager 320 can comprise issuing the request from an administration tool executing on the first server. It should be understood that the request to reset at least a portion of the common cache 340 and 360 can comprise a request to reset all of the common cache 340 and 360.

The server manager 320 can receive the request from a first server 305 of the plurality of servers to reset at least a portion of the common cache 340 and 360 and in turn broadcast a cache reset notification to the plurality of servers 325 and 345 in response to receiving the request from the first server 305. Broadcasting the cache reset notification by the server manager 320 to the plurality of servers 325 and 345 in response to receiving the request from the first server 305 can further comprise converting the request to a cache reset notification. The cache reset notification can identify a table and environment of the portion of the cache to be reset.

The cache reset notification from the server manager 320 can be received by at least a second server 325 of the plurality of servers 325 and 345. The second server 325 can, in response to receiving the cache reset notification, reset a portion of the common cache 340 based on the cache reset notification and without restarting the second server 325. As noted above, each server 325 and 345 can include an implementation of a reset cache method, for example in the kernel process manager 330 and 350, which can be invoked through an API by the reset cache notification from the server manager 320. This method can check for an environment and a table identified in the notification. If the environment and table are found in the local cache 340 for the server 325, the method can identify a cache handle based on that environment and table and reset the records of the table and environment with that cache handle.

Resetting a portion of the common cache 340 based on the cache reset notification and without restarting the second server 325 can comprise locating, by the server 325, the environment identified by the cache reset notification in the common cache 340 on the server 325. The server 325 can also locate the table in the common cache 340 on the server 325 and identify a cache handle for the portion of the common cache based on the located environment and table. In some cases, prior to resetting records of the common cache 340 identified by the cache handle and within the identified environment and table a thread halt command can be issued. The thread halt command can cause each thread of processes 335 executing on the server 325 to commit current work and halt operation. Records of the common cache 340 identified by the cache handle and within the identified environment and table can then be reset. After resetting records of the common cache identified by the cache handle and within the identified environment and table, a thread halt release command can be issued. The thread halt release command can cause each halted thread of processes 335 of the second server 325 to resume operation.

Figure 4:
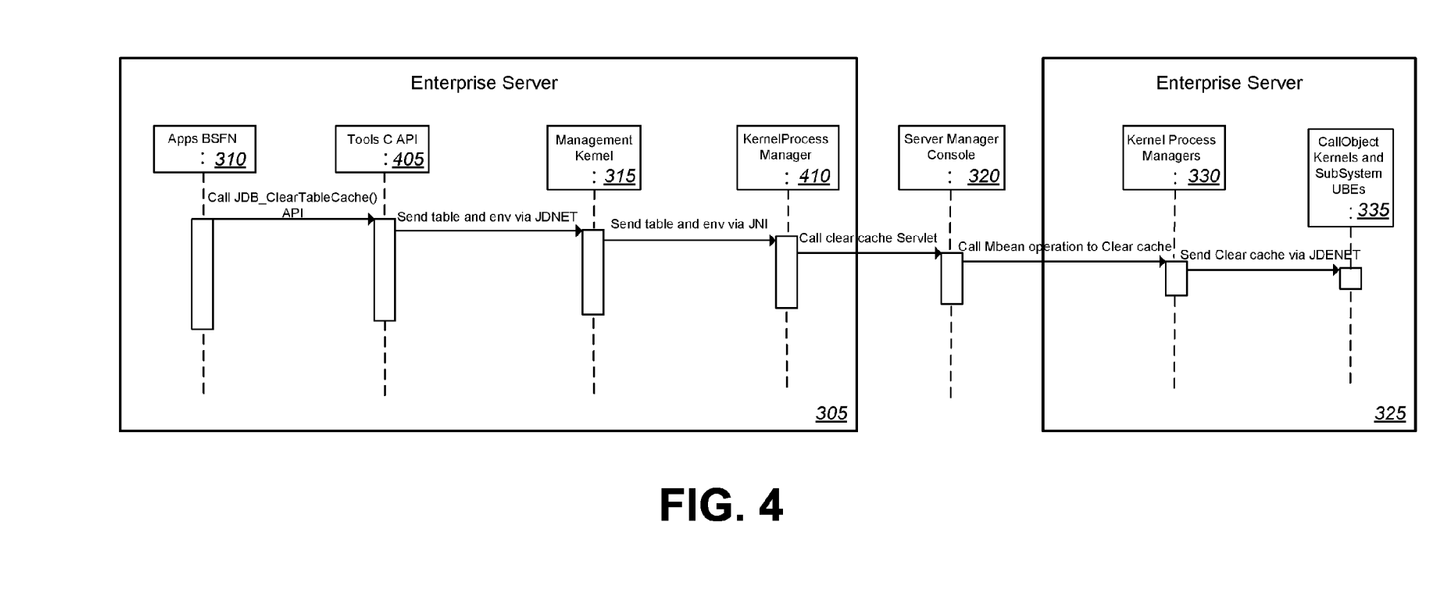
FIG. 4 is a diagram illustrating a flow of a process for resetting a common cache across servers without restarting the servers according to one embodiment of the present invention.

FIG. 4 is a diagram illustrating a flow of a process for resetting a common cache across servers without restarting the servers according to one embodiment of the present invention. More specifically, this example illustrates one particular implementation of a sequence diagram for a specific architecture that can be used to implement clear cache across enterprise server instances. The process can be outlined as follows. On the first server 305, the application 310 code can call the clear table cache public API 405. The clear table cache API 405 can send a message such as a JDENET message with table name to the management kernel 315. The management kernel 315 and kernel process manager 410 can send a clear cache message to the server manager console 320 using a servlet URL. The server manager console 320 can in turn send a broadcast message to the running enterprise server 325 instances, for example using a JMX Mbean operation. Each of the enterprise server 325 instances, e.g., through the kernel process managers 330, can send a clear table cache message across its running processes using JDENET. Each of the processes 335 can then clear the cache while preserving the active transactions.

Figure 5:
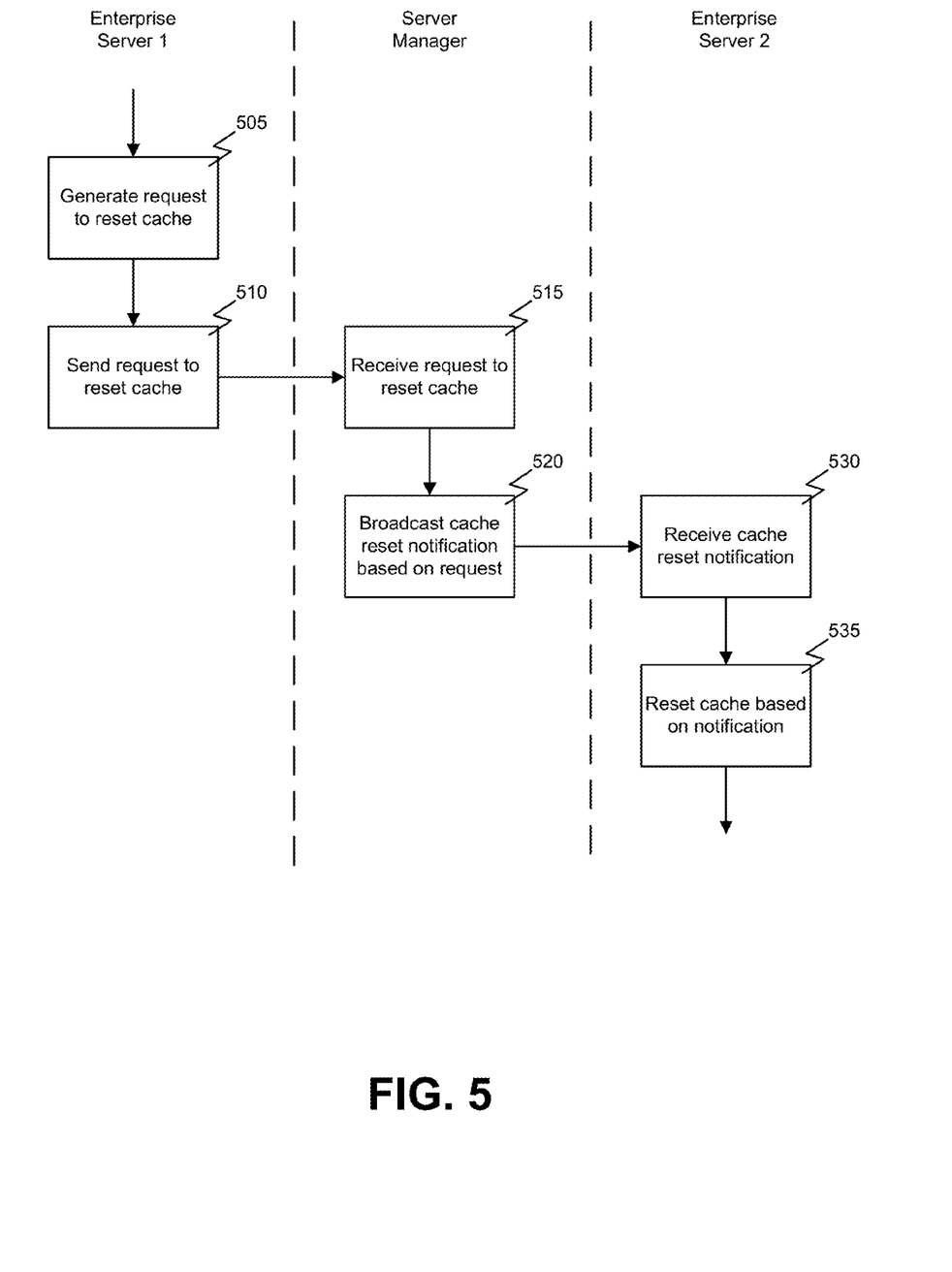
FIG. 5 is a flowchart illustrating a process for resetting a common cache across servers without restarting the servers according to one embodiment of the present invention.

FIG. 5 is a flowchart illustrating a process for resetting a common cache across servers without restarting the servers according to one embodiment of the present invention. As illustrated in this example, resetting a portion of a common cache can begin with generating 505 a request to reset the cache by a first enterprise server. The request to reset at least a portion of the common cache can be sent 510 from the first server to the server manager. As noted above, sending 510 the request to reset at least a portion of the common cache from the first server to the server manager comprises making an Application Program Interface (API) call to the server manager from an application executing on the first server. In other cases, sending 510 the request to reset at least a portion of the common cache from the first server to the server manager comprises issuing the request from an administration tool executing on the first server. It should be understood that the request to reset at least a portion of the common cache can comprise a request to reset all of the common cache.

The server manager can receive 515 the request from a first server of the plurality of servers to reset at least a portion of the common cache and in turn broadcast 520 a cache reset notification to the plurality of servers in response to receiving the request from the first server. Broadcasting 520 the cache reset notification by the server manager to the plurality of servers in response to receiving 515 the request from the first server can further comprise converting the request to a cache reset notification. The cache reset notification can identify a table and environment of the portion of the cache to be reset.

The cache reset notification from the server manager can be received 530 by at least a second server of the plurality of servers. The second server can, in response to receiving 530 the cache reset notification, reset 535 a portion of the common cache based on the cache reset notification and without restarting the second server. As noted above, each server can include an implementation of a reset cache method which can be invoked through an API by the clear cache notification. This method can check for an environment and a table identified in the notification. If the environment and table are found in the local cache for the server, the method can identify a cache handle based on that environment and table and reset the records of the table and environment with that cache handle.

Figure 6:
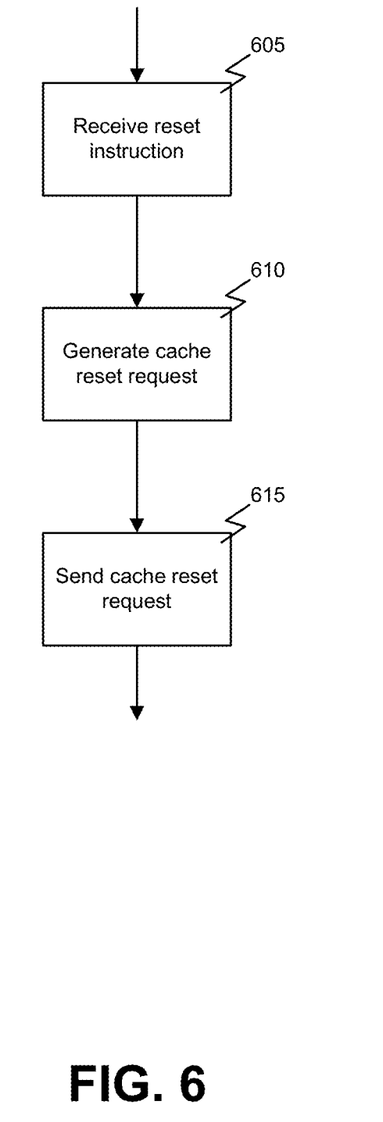
FIG. 6 is a flowchart illustrating a process for initiating a common cache reset across servers according to one embodiment of the present invention.

FIG. 6 is a flowchart illustrating a process for initiating a common cache reset across servers according to one embodiment of the present invention. More specifically, this illustrates an exemplary process that may be performed by server initiating a cache reset as described above. As illustrated in this example, resetting a portion of a common cache can begin with receiving 605 a reset instruction. The instruction can be received 605 as an Application Program Interface (API) call from an application or an administration tool executing on the server. A request to reset the cache can be generated 610 by the server. The request to reset at least a portion of the common cache can be sent 615 from the server to the server manager, e.g., as an API call to the server manager. It should be understood that the request to reset at least a portion of the common cache can comprise a request to reset all of the common cache.

Figure 7:
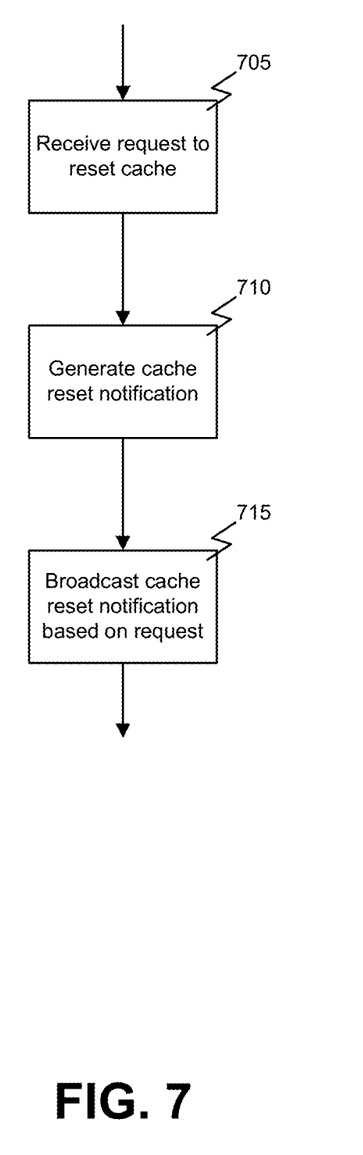
FIG. 7 is a flowchart illustrating a process for managing a common cache reset across servers according to one embodiment of the present invention.

FIG. 7 is a flowchart illustrating a process for managing a common cache reset across servers according to one embodiment of the present invention. More specifically, this illustrates an exemplary process that may be performed by server manager described above. As illustrated in this example, the server manager can receive 705 the request from a server of the plurality of servers to reset at least a portion of the common cache. In response to receiving 705 the request from the server, the server manager can convert 710 the request to a cache reset notification and broadcast 715 the cache reset notification to the plurality of servers.

Figure 8:
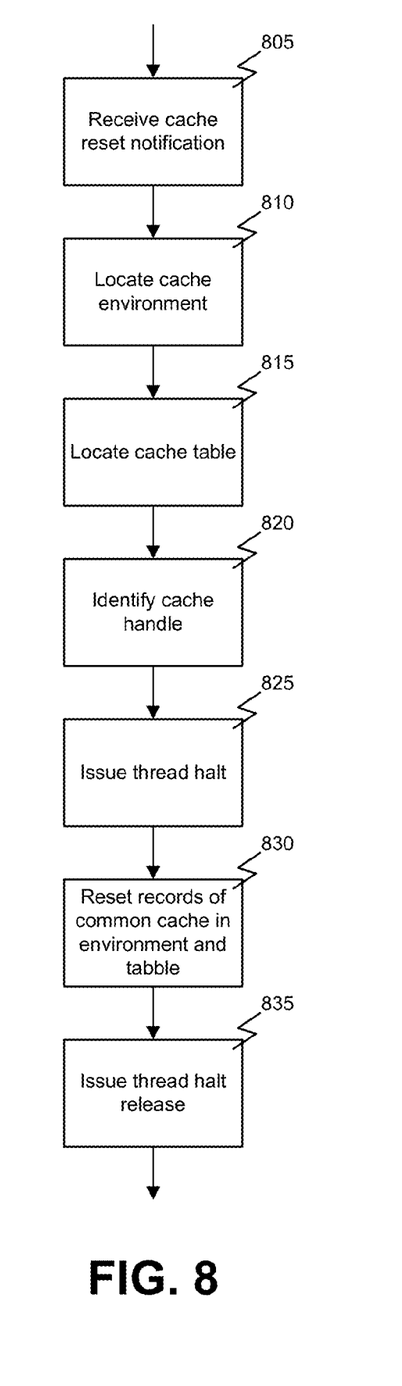
FIG. 8 is a flowchart illustrating a process for performing a common cache reset without restarting according to one embodiment of the present invention.

FIG. 8 is a flowchart illustrating a process for performing a common cache reset without restarting according to one embodiment of the present invention. More specifically, this illustrates an exemplary process that may be performed by the cache reset method executing on each server in response to receiving a cache reset notification from the server manager. As illustrated in this example, resetting a portion of the common cache based on the cache reset notification and without restarting the second server can comprise locating 810, by the server, the environment identified by the cache reset notification in the common cache on the server. The server can also locate 815 the table in the common cache on the server and identify 820 a cache handle for the portion of the common cache based on the located environment and table. In some cases, prior to resetting 830 records of the common cache identified by the cache handle and within the identified environment and table a thread halt command can be issued 825. The thread halt command can cause each thread of the server to commit current work and halt operation. Records of the common cache identified by the cache handle and within the identified environment and table can then be reset 830. After resetting 830 records of the common cache identified by the cache handle and within the identified environment and table, a thread halt release command can be issued 835. The thread halt release command can cause each halted thread of the second server to resume operation.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method, comprising:
receiving, by a server manager, a request from a first server to reset at least a portion of a common cache;
broadcasting, by the server manager, a cache reset notification to a plurality of servers in response to receiving the request from the first server, the cache reset notification specifying the portion of the common cache to be reset, wherein each server in the plurality of servers maintains a copy of the common cache;
receiving, by each server of the plurality of servers, the cache reset notification from the server manager;
identifying, by each server of the plurality of servers, a portion of the copy of the common cache maintained by the server to be reset based on the cache reset notification; and
resetting, by each server of the plurality of servers, the portion of the copy of the common cache maintained by the server without restarting the server;
wherein broadcasting, by the server manager, the cache reset notification to the plurality of servers in response to receiving the request from the first server further comprises converting the request to the cache reset notification, the cache reset notification identifying a table and environment of the portion of the common cache to be reset;
wherein identifying, by each server of the plurality of servers, the portion of the copy of the common cache maintained by the server to be reset based on the cache reset notification comprises:
locating, by each server of the plurality of servers, the environment in the copy of the common cache on the server;
locating, by each server of the plurality of servers, the table in the copy of the common cache on the server; and
identifying, by each server of the plurality of servers, a cache handle for the portion of the common cache based on the located environment and table; and
wherein resetting, by each server of the plurality of servers, the portion of the copy of the common cache maintained by the server without restarting the server comprises:
resetting, by each server of the plurality of servers, records of the copy of the common cache identified by the cache handle and within the located environment and table;
wherein resetting records of the copy of the common cache identified by the cache handle and within the located environment and table further comprises:
prior to resetting records of the common cache identified by the cache handle and within the located environment and table, issuing, by at least a second server of the plurality of servers, a thread halt command, the thread halt command causing each thread of the second server to commit current work and halt operation; and
after resetting records of the common cache identified by the cache handle and within the located environment and table, issuing, by the second server, a thread halt release command, the thread halt release command causing each halted thread of the second server to resume operation.

2. The method of claim 1, further comprising sending the request to reset the at least the portion of the common cache from the first server to the server manager.

3. The method of claim 2, wherein sending the request to reset the at least the portion of the common cache from the first server to the server manager comprises making an Application Program Interface (API) call to the server manager from an application executing on the first server.

4. The method of claim 2, wherein sending the request to reset the at least the portion of the common cache from the first server to the server manager comprises issuing the request from an administration tool executing on the first server.

5. The method of claim 1, wherein the request to reset at least the portion of the common cache comprises a request to reset all of the common cache.

6. A system comprising:
one or more processors; and
a memory coupled with and readable by the processors and storing a set of instructions which, when executed by the processors, causes the processors to reset a common cache across a plurality of servers by:
receiving, by a server manager, a request from a first server to reset at least a portion of the common cache;
broadcasting, by the server manager, a cache reset notification to the plurality of servers in response to receiving the request from the first server, the cache reset notification specifying the portion of the common cache to be reset, wherein each server in the plurality of servers maintains a copy of the common cache;
receiving, by each of the plurality of servers, the cache reset notification from the server manager, identifying, by each server of the plurality of servers, a portion of the copy of the common cache maintained by the server to be reset based on the cache reset notification; and
resetting, by each server of the plurality of servers, the portion of the copy of the common cache maintained by the server without restarting the server;
wherein broadcasting, by the server manager, the cache reset notification to the plurality of servers in response to receiving the request from the first server further comprises converting the request to the cache reset notification, the cache reset notification identifying a table and environment of the portion of the common cache to be reset;
wherein identifying, by each server of the plurality of servers, the portion of the copy of the common cache maintained by the server to be reset based on the cache reset notification comprises:
locating, by each server of the plurality of servers, the environment in the copy of the common cache on the server;
locating, by each server of the plurality of servers, the table in the copy of the common cache on the server; and
identifying, by each server of the plurality of servers, a cache handle for the portion of the common cache based on the located environment and table; and
wherein resetting, by each server of the plurality of servers, the portion of the copy of the common cache maintained by the server without restarting the server comprises:
resetting, by each server of the plurality of servers, records of the copy of the common cache identified by the cache handle and within the located environment and table;
wherein resetting records of the copy of the common cache identified by the cache handle and within the located environment and table further comprises:
prior to resetting records of the common cache identified by the cache handle and within the located environment and table, issuing, by at least a second server of the plurality of servers, a thread halt command, the thread halt command causing each thread of the second server to commit current work and halt operation; and after resetting records of the common cache identified by the cache handle and within the located environment and table, issuing, by the second server, a thread halt release command, the thread halt release command causing each halted thread of the second server to resume operation.

7. The system of claim 6, further comprising sending the request to reset the at least the portion of the common cache from the first server to the server manager.

8. The system of claim 7, wherein sending the request to reset the at least the portion of the common cache from the first server to the server manager comprises making an Application Program Interface (API) call to the server manager from an application executing on the first server.

9. The system of claim 7, wherein sending the request to reset the at least the portion of the common cache from the first server to the server manager comprises issuing the request from an administration tool executing on the first server.

10. A computer-readable memory comprising a set of instructions stored therein which, when executed by a processor, causes the processor to reset a common cache across a plurality of servers by:

receiving, by a server manager, a request from a first server to reset at least a portion of the common cache;

broadcasting, by the server manager, a cache reset notification to the plurality of servers in response to receiving the request from the first server, the cache reset notification specifying the portion of the common cache to be reset, wherein each server in the plurality of servers maintains a copy of the common cache;

receiving, by each server of the plurality of servers, the cache reset notification from the server manager;

identifying, by each server of the plurality of servers, a portion of the copy of the common cache maintained by the server to be reset based on the cache reset notification; and resetting, by each server of the plurality of servers, the portion of the copy of the common cache maintained by the server without restarting the server;

wherein broadcasting, by the server manager, the cache reset notification to the plurality of servers in response to receiving the request from the first server further comprises converting the request to the cache reset notification, the cache reset notification identifying a table and environment of the portion of the common cache to be reset;

wherein identifying, by each server of the plurality of servers, the portion of the copy of the common cache maintained by the server to be reset based on the cache reset notification comprises:

locating, by each server of the plurality of servers, the environment in the copy of the common cache on the server;

locating, by each server of the plurality of servers, the table in the copy of the common cache on the server; and identifying, by each server of the plurality of servers, a cache handle for the portion of the common cache based on the located environment and table; and wherein resetting, by each server of the plurality of servers, the portion of the copy of the common cache maintained by the server without restarting the server comprises:

resetting, by each server of the plurality of servers, records of the copy of the common cache identified by the cache handle and within the located environment and table;

wherein resetting records of the copy of the common cache identified by the cache handle and within the located environment and table further comprises:

prior to resetting records of the common cache identified by the cache handle and within the located environment and table, issuing, by at least a second server of the plurality of servers, a thread halt command, the thread halt command causing each thread of the second server to commit current work and halt operation; and after resetting records of the common cache identified by the cache handle and within the located environment and table, issuing, by the second server, a thread halt release command, the thread halt release command causing each halted thread of the second server to resume operation.

11. The computer-readable memory of claim 10, further comprising sending the request to reset the at least the portion of the common cache from the first server to the server manager.

12. The computer-readable memory of claim 11, wherein sending the request to reset the at least the portion of the common cache from the first server to the server manager comprises making an Application Program Interface (API) call to the server manager from an application executing on the first server.

13. The computer-readable memory of claim 11, wherein sending the request to reset the at least the portion of the common cache from the first server to the server manager comprises issuing the request from an administration tool executing on the first server.

* * * * *

UNITED STATES PATENT AND TRADEMARK OFFICE
CERTIFICATE OF CORRECTION

PATENT NO. : 9,654,557 B2
APPLICATION NO. : 13/888413
DATED : May 16, 2017
INVENTOR(S) : Pradip K. Pandey It is certified that error appears in the above-identified patent and that said Letters Patent is hereby corrected as shown below:

In the Drawings

Sheet 4 of 8, FIG. 4:
Reference Numeral 305: remove "JENET" and replace with --JDENET--
Reference Numeral 410: remove "KernelProcess" and replace with --Kernel Process--
Reference Numeral 335: remove "CallObject" and replace with --Call Object--
Reference Numeral 405: remove "Tools C API" and replace with --Clear Table Cache API--

Sheet 8 of 8, FIG. 8:
Reference Numeral 830: remove "tabble" and replace with --table--

In the Specification

Column 7, Line 52: remove "cache 335" and replace with --cache 340--

Column 7, Line 54: remove "cache 335" and replace with --cache 340--

In the Claims

Column 12, Line 26: remove "each of" and replace with --each server of--

Column 12, Line 27: remove "manager," and replace with --manager;-- AND enter a line return after "manager;"

Signed and Sealed this
Second Day of April, 2019

Andrei Iancu
*Director of the United States Patent and Trademark Office*